Patented May 25, 1926.

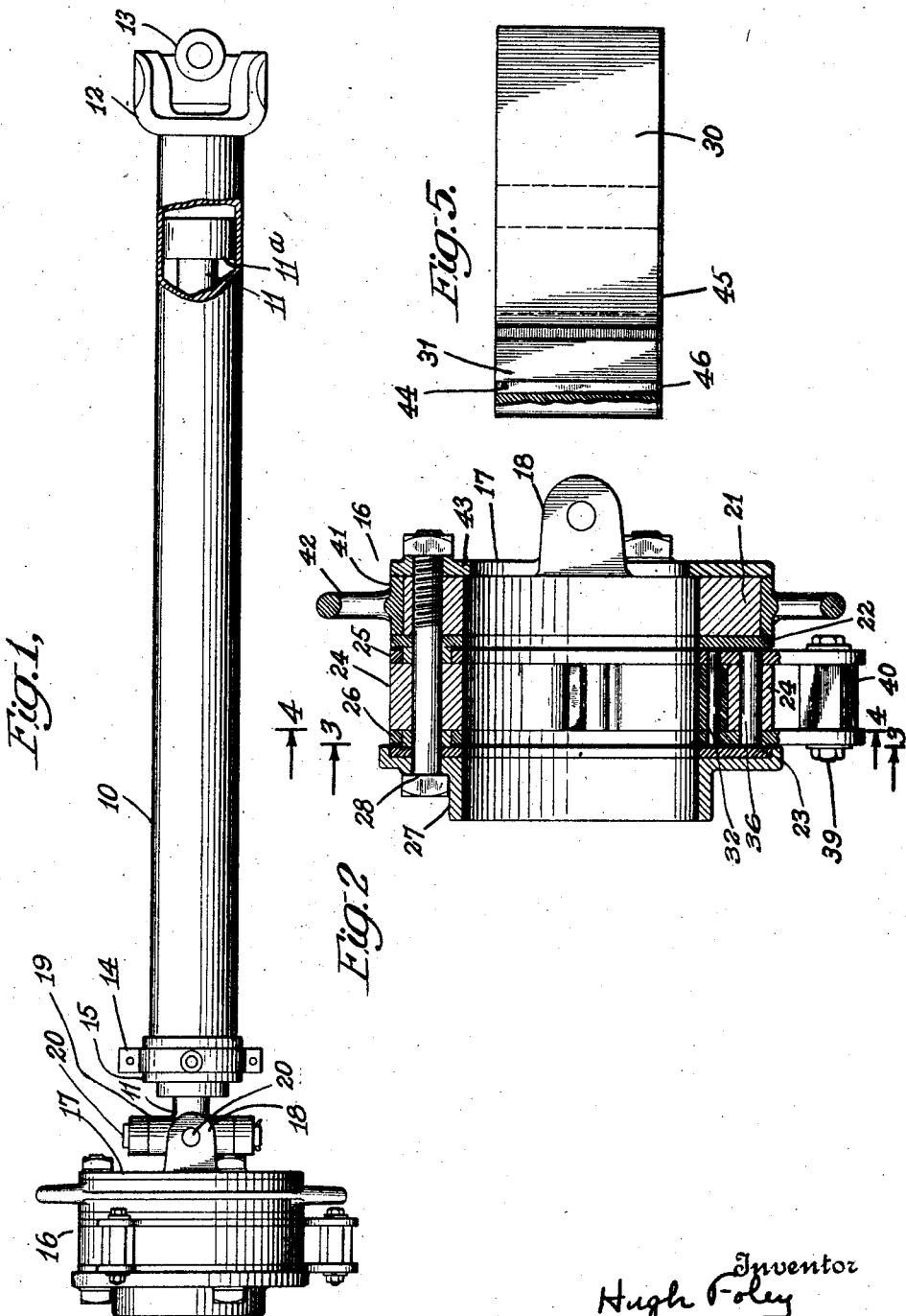

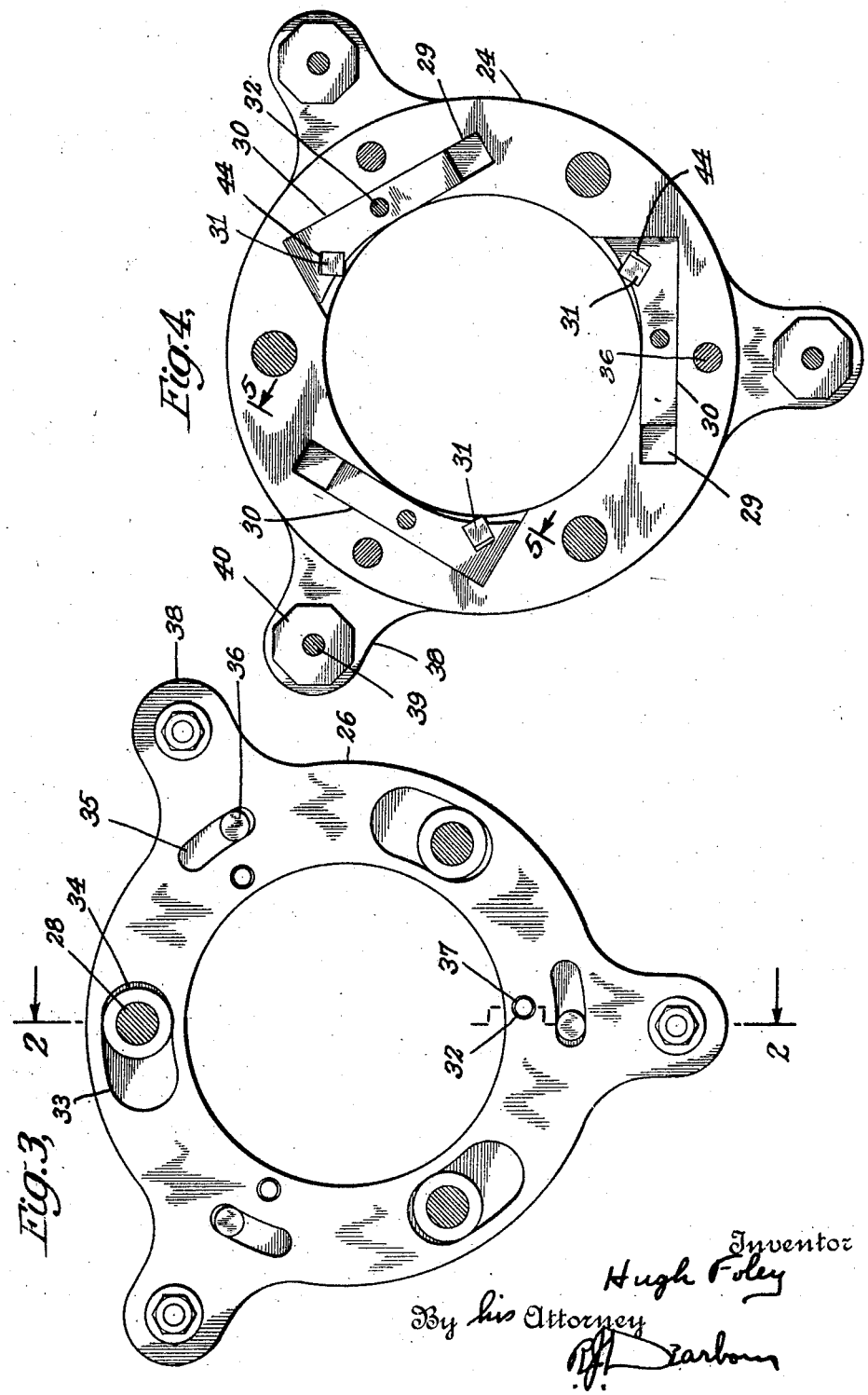

1,586,301

UNITED STATES PATENT OFFICE.

HUGH FOLEY, OF SOUR LAKE, TEXAS.

APPARATUS FOR ROTATING PIPE.

Application filed May 2, 1921. Serial No. 466,342.

This invention relates to new and useful improvements in mechanism for screwing together joints of pipe and the like and has particular reference to an engaging head for gripping the pipe in order that same may be rotated.

One object of the invention is to provide gripping mechanism capable of being positively moved into position for gripping and arranged to take hold of the object and rotate it quickly and without slipping.

Another object is to provide means for gripping the pipe in such manner that the pipe collar or coupling will not be crushed by the gripping mechanism thus avoiding one of the disadvantages commonly encountered with pipe gripping apparatus heretofore in use.

Other objects of the invention will become apparent from the following detailed description thereof.

In the drawings:

Figure 1 is a longitudinal elevation of an apparatus constructed in accordance with the invention and constituting an embodiment thereof;

Fig. 2 is a vertical section of the pipe gripping head taken on the line 2—2 of Fig. 3 and drawn to a larger scale than Fig. 1;

Fig. 3 is a section taken on line 3—3 of Fig. 2;

Fig. 4 is a section taken on line 4—4 of Fig. 2; and

Fig. 5 is an enlarged sectional view taken on line 5—5 of Fig. 4.

Referring now to Fig. 1 a rotatable pipe 10 is shown within which is mounted a propeller shaft 11. The pipe has a coupling yoke 12 and center 13 by which it may be placed in operative connection with suitable mechanism for rotating same. The shaft is provided with a guide member 11ª and has a drive nut 15 by which power is transmitted from the rotatable pipe to the shaft. The driving mechanism which operates the apparatus is preferably mounted on a tractor and thus the pipe 10 and shaft 11 may be attached to the rear thereof, the pipe having a bail ring 14 by which it may be swung from a suitable cable or other elevating mechanism.

The shaft 11 is attached in any convenient manner to a gripping head 16 adapted to engage with the pipe which it is desired to rotate. As illustrated the head 16 has a coupling plate 17 having a pair of lugs 18 which are attached to the shaft 11 by means of a coupling sleeve 19 and pins 20.

The various details of the preferred form of head 16 are more clearly shown in Figs. 2, 3, and 4. As illustrated therein the head is formed of the coupling plate 17 hereinbefore mentioned, a spacer ring 21, stationary rings 22 and 23, jaw ring 24, adjacent to which are movable rings 25 and 26, and an outer ring 27. These several rings constituting the head are secured by means of bolts 28 which pass through holes in the rings, the arrangement being such that the several parts, with the exception of the movable rings 25 and 26, are held together rigidly.

The jaw ring 24 is provided with a plurality of slots 29 which communicate with the circular opening enclosed within the jaw ring. In each slot 29 is mounted a jaw shoe 30 which is adapted to have a sliding movement therein. Each shoe is formed with a hole through which passes a pin 32 terminating on either side of the shoe in the movable rings 25 and 26. The jaw ring is preferably equipped with a plurality of guide lugs 36.

Each shoe is provided with a jaw or dog 31 adapted to engage with the pipe to be rotated. The jaw is preferably detachable from the shoe so that when the engaging edges have become dulled with usage new edges may be substituted. In the form illustrated the dog is rectangular thus having four engaging edges; when one edge is dulled it is only necessary to change the position of the dog in order that another edge may be used. Each dog is positioned in a slot in the shoe as clearly shown in Fig. 4. Each slot has somewhat larger dimensions than that of the dog in order that a wedge 44 may be used to hold the dog firmly in position, the face of the slot adjacent the wedge being preferably tapered to accommodate the wedge. As shown in Fig. 5 one side of the shoe has a closure 45 by which the slot is closed at that end thereof, an opening 46 being provided by which the wedge may be driven out when it is desired to remove the jaw 31.

The movable rings may each be constructed alike and the form of the ring 26 which is shown in Fig. 3 may be taken as typical. The holes 33 through which pass the bolts 28 are preferably elliptical in form or at least of greater diameter than the bolts in order that the ring may be movable. If desired, each bolt may be equipped with a ring 34 contained within the slot 33. The shift ring 26 is likewise equipped with elliptical slots 35 for the guide lugs 36 and with holes 37 for the pins 32. The shift rings are preferably provided with suitable operating handles which may take the form of a number of lugs or projections 38, adjacent pairs of projections on the rings 25 and 26 respectively being connected by means of bolts 39 each of which carries a handle member 40. The two shift rings may thus be operated as a unit.

It will be seen that when the rings 25 and 26 are shifted the pins 32 will be moved and thus the jaw shoes 30 will be moved in the slots 29. By means of the shift rings the jaws 31 are thus moved to and from engagement with the pipe it is desired to rotate. The holes 37 should be of elliptical form or of sufficient diameter to permit the necessary movement of the pins 32; as the shoe 30 slides back and forth in the slot 29 the path of movement of the pin is slightly eccentric in its relation to the circular opening contained within the jaw ring.

The head 16 is provided with a loose ring 41 having handles 42 in order that the shaft 10 and head 16 may be conveniently manipulated when connecting it to joints of pipe.

The object of the spacer ring 21 is to give such depth to the engaging head 16 that the entire collar of a pipe may be inserted within and retained by the head in order to avoid crushing or weakening of the collar, which frequently occurs in using gripping heads which do not fully encircle in the collar. Obviously in the case of comparatively narrow collars or by constructing the other ring members of the head of sufficient width, the use of a spacer ring as such may be avoided.

The engaging head is preferably so constructed that there will be a shoulder 43 against which the pipe may be centered when inserting it within the head. This insures that the pipe will be held squarely and minimizes the danger of stripping the threads when the head is rotated.

My invention is capable of a very efficient utilization in the laying of pipe lines. By mounting the apparatus described herein on a suitable tractor or other power-operated mechanism the apparatus may be employed in laying pipe lines very quickly and efficiently. Each joint of pipe is inserted in the head 16 and by simply shifting the rings 25 and 26 the pipe is securely gripped by the engaging jaws thus permitting the several joints to be screwed together by means of the propeller 11.

Apparatus of preferred form and construction has been illustrated and described for the purpose of showing a way in which this invention may be used, but the inventive thought upon which the application is based, is broader than this illustrative embodiment thereof, and I therefore intend no limitations other than those imposed by the appended claims.

What I claim is:—

1. In a device of the character described, a gripping head comprising a ring having a plurality of recesses formed interiorly thereof, a slidable shoe mounted in each of said recesses and formed with a slot near one end thereof, a detachable gripping dog disposed in each of said slots, a wedge disposed in each of said slots between the dog and the shoe for holding the dog firmly in position, and means for moving said dogs into gripping engagement with a pipe.

2. Apparatus for rotating a pipe, comprising a pair of spaced movable rings each having a plurality of elongated slots therein, a jaw ring disposed between said movable rings and formed with a plurality of recesses interiorly thereof, a slidable gripping member mounted in each of said recesses and carrying a pin supported at its ends in the movable rings, a spacer ring disposed outwardly of one of the movable rings, and means extending through all of the rings and through the slots in the movable rings for maintaining the several rings in operative position and for actuating the movable rings so as to force the gripping members therein into engagement with the pipe to be rotated.

In witness whereof I have hereunto set my hand and seal this 15th day of April, 1921.

HUGH FOLEY.